US012125632B2

(12) United States Patent
Drofenik et al.

(10) Patent No.: US 12,125,632 B2
(45) Date of Patent: Oct. 22, 2024

(54) TRANSFORMER WITH A CASTING EMBEDDING A WINDING ARRANGEMENT AND METHOD OF MANUFACTURING A WINDING ARRANGEMENT FOR A TRANSFORMER

(71) Applicant: HITACHI ENERGY LTD, Zürich (CH)

(72) Inventors: Uwe Drofenik, Zürich (CH); Thomas Gradinger, Aarau Rohr (CH)

(73) Assignee: HITACHI ENERGY LTD, Zürich (CH)

( * ) Notice: Subject to any disclaimer, the term of this patent is extended or adjusted under 35 U.S.C. 154(b) by 730 days.

(21) Appl. No.: 17/279,611

(22) PCT Filed: Sep. 24, 2019

(86) PCT No.: PCT/EP2019/075745
§ 371 (c)(1),
(2) Date: Mar. 25, 2021

(87) PCT Pub. No.: WO2020/064757
PCT Pub. Date: Apr. 2, 2020

(65) Prior Publication Data
US 2021/0391117 A1 Dec. 16, 2021

(30) Foreign Application Priority Data
Sep. 25, 2018 (EP) .................................... 18196553

(51) Int. Cl.
*H01F 27/32* (2006.01)
*H01F 27/24* (2006.01)
(Continued)

(52) U.S. Cl.
CPC ........... *H01F 27/327* (2013.01); *H01F 27/24* (2013.01); *H01F 27/324* (2013.01);
(Continued)

(58) Field of Classification Search
CPC ...... H01F 27/327; H01F 27/24; H01F 27/324; H01F 41/005; H01F 41/066; H01F 41/127
See application file for complete search history.

(56) References Cited

U.S. PATENT DOCUMENTS 4,459,575 A * 7/1984 Geissler .................. H01F 27/36
336/196

FOREIGN PATENT DOCUMENTS

CN 104269250 A 1/2015
CN 105810418 A 7/2016
(Continued)

OTHER PUBLICATIONS

Decision for Grant of Patent, Korean Patent Application No. 10-2021-7001311, mailed Feb. 28, 2023, 3 pages.
(Continued)

*Primary Examiner* — Malcolm Barnes
(74) *Attorney, Agent, or Firm* — Sage Patent Group

(57) ABSTRACT

A transformer is described. The transformer includes a transformer core having a core leg having a longitudinal axis, a low voltage winding arranged around the core leg, the low voltage winding extending along a first length in the direction of the longitudinal axis, a high voltage winding arranged around the low voltage winding, the high voltage winding extending along a second length in the direction of the longitudinal axis, wherein the second length is shorter than the first length, and a casting embedding the low voltage winding and the high voltage winding. The casting has a recess. The recess is provided at a radial location of the high voltage winding and the recess extends in the direction of the longitudinal axis.

20 Claims, 3 Drawing Sheets

(51) Int. Cl.

| | |
|---|---|
| ***H01F 41/00*** | (2006.01) |
| ***H01F 41/06*** | (2016.01) |
| ***H01F 41/066*** | (2016.01) |
| ***H01F 41/12*** | (2006.01) |

(52) U.S. Cl.
CPC ......... *H01F 41/005* (2013.01); *H01F 41/066* (2016.01); *H01F 41/127* (2013.01)

(56) References Cited

FOREIGN PATENT DOCUMENTS

| | | | | | |
|---|---|---|---|---|---|
| CN | 206489956 | U | | 9/2017 | |
| DE | 2826266 | A1 | * | 12/1979 | |
| JP | 54164213 | A | | 12/1979 | |
| JP | 61158116 | A | * | 7/1986 | ........... H01F 27/327 |
| JP | S61158116 | A | * | 7/1986 | |

OTHER PUBLICATIONS

First Office Action for Chinese Patent Application No. 201980047404.7, mailed Aug. 30, 2023, 7 pages.
International Search Report and Written Opinion of the International Searching Authority, PCT/EP2019/075745, mailed Dec. 19, 2019, 13 pages.
Extended European Search Report for European Patent Application No. 18196553.4, mailed Mar. 15, 2019, 8 pages.

* cited by examiner

TRANSFORMER WITH A CASTING EMBEDDING A WINDING ARRANGEMENT AND METHOD OF MANUFACTURING A WINDING ARRANGEMENT FOR A TRANSFORMER

CROSS REFERENCE TO RELATED APPLICATIONS

This application is a 35 U.S.C. § 371 national stage application of PCT International Application No. PCT/EP2019/075745 filed on Sep. 24, 2019, which in turns claims foreign priority to European Patent Application No. 18196553.4, filed on Sep. 25, 2018, the disclosures and content of which are incorporated by reference herein in their entirety.

TECHNICAL FIELD

Embodiments of the present disclosure relate to transformers having a casting embedding a winding arrangement including a high voltage winding arranged around a low voltage winding. In particular, embodiments of the present disclosure relate to dry-cast transformers, particularly dry-cast medium-frequency transformers (MFTs). Further embodiments of the present disclosure relate to methods of manufacturing a winding arrangement for a transformer, particularly for a dry-cast medium-frequency transformer.

BACKGROUND

Medium-frequency transformers (MFTs) are key components in various power-electronic systems. Examples in rail vehicles are auxiliary converters and solid-state transformers (SSTs) replacing the bulky low-frequency traction transformers. Further applications of SSTs are being considered, for example for grid integration of renewable energy sources, EV charging infrastructure, data centers, or power grids on board of ships. It is expected that SSTs will play an increasingly important role in the future.

The electric insulation constitutes a significant challenge in MFTs, because, on the one hand, operating voltages can be high (in the range of 10 kV to 50 kV) and on the other hand, the power of an individual MFT is rather low (in the range of several hundred kVA) compared to conventional low-frequency distribution and power transformers. Therefore, the space occupied by the electrical insulation is relatively large compared to the total size of the MFT. In particular, the filling ratio of the core window, i.e. the fraction of core-window area filled with winding conductors, is relatively poor. Smart solutions are needed to minimize insulation distances and optimize the filling ratio.

For the mentioned power and voltage range of MFTs, dry-cast insulation is, in principle, an attractive solution. This means that smart, space-saving designs are needed for dry-cast MFTs.

The windings of conventional dry-cast transformers typically rest on coil blocks. The coil blocks rest on the core yoke or on a frame, both of which are electrically on ground. The mold compound has a high relative permittivity $\varepsilon_r$, e.g. $\varepsilon_r=5$. If the coil block is also from cast resin, the dielectric length, i.e. geometric length divided by relative permittivity $\varepsilon_r$, is small. This leads to a high electric field in the air gaps between coil block and frame, and coil block and cast winding. This in turn causes partial discharge in the air gaps at comparatively low voltages.

Accordingly, there is a continuing demand for transformers, particularly dry-cast medium-frequency transformers, which are improved compared to the state of the art, particularly with respect to providing an optimal field grading and thus usage of the core window, allowing compact and economic transformer design.

German patent application publication no. DE 28 26 266 A1 describes a polyphase transformer having coils which are embedded in casting resin. The high voltage and low voltage coils of all phases, together with connections and terminals are cast into a single resin block.

Japanese patent application publication no. JP S61-158116 A describes a transformer having a structure consisting mainly of a ferrite core, a coil pole wound with a winding, an epoxy resin for casting, and an exterior case. The exterior cases and coil bobbins are composed of ether type resin or epoxy resin, particularly a polyphenylene ether-based resin having improved adhesion for an outer case and a coil bobbin of the transformer.

SUMMARY

In light of the above, a transformer and method of manufacturing a winding arrangement for a transformer according to the independent claims are provided. Further aspects, advantages, and features are apparent from the dependent claims, the description, and the accompanying drawings.

According to an aspect of the present disclosure, a transformer is provided, the transformer includes a transformer core having a core leg having a longitudinal axis. Additionally, the transformer includes a low voltage winding arranged around the core leg. The low voltage winding extends along a first length L1 in the direction of the longitudinal axis. Further, the transformer includes a high voltage winding arranged around the low voltage winding. The high voltage winding extends along a second length L2 in the direction of the longitudinal axis. The second length L2 is shorter than the first length L1. Moreover, the transformer includes a casting embedding the low voltage winding and the high voltage winding. The casting has a recess. The recess is provided at a radial location of the high voltage winding and the recess extends in the direction of the longitudinal axis.

Accordingly, the design of the transformer of the present disclosure is improved compared to conventional transformers. In particular, with the transformer as described herein an optimal field grading and thus usage of the core window, allowing compact and economic transformer design, can be provided.

According to a further aspect of the present disclosure, a method of manufacturing a winding arrangement for a transformer is provided. The method includes arranging a low voltage winding around a substantially vertical axis such that the low voltage winding extends along a first length L1 in the direction of the substantially vertical axis. Additionally, the method includes arranging a high voltage winding around the low voltage winding such that the high voltage winding extends along a second length L2 in the direction of the substantially vertical axis. The second length L2 is shorter than the first length L1. Further, the method includes providing a casting mold surrounding the low voltage winding and the high voltage winding. The casting mold has a bottom wall. At a radial location of the high voltage winding the bottom wall has an axial projection. Moreover, the method includes embedding the low voltage winding and the high voltage winding in an insulating material by casting the insulating material into the casting mold.

Accordingly, beneficially a method of manufacturing a winding arrangement of a transformer can be provided such that a compact and economic transformer design can be provided with which the field grading and thus the usage of the core window can be improved.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
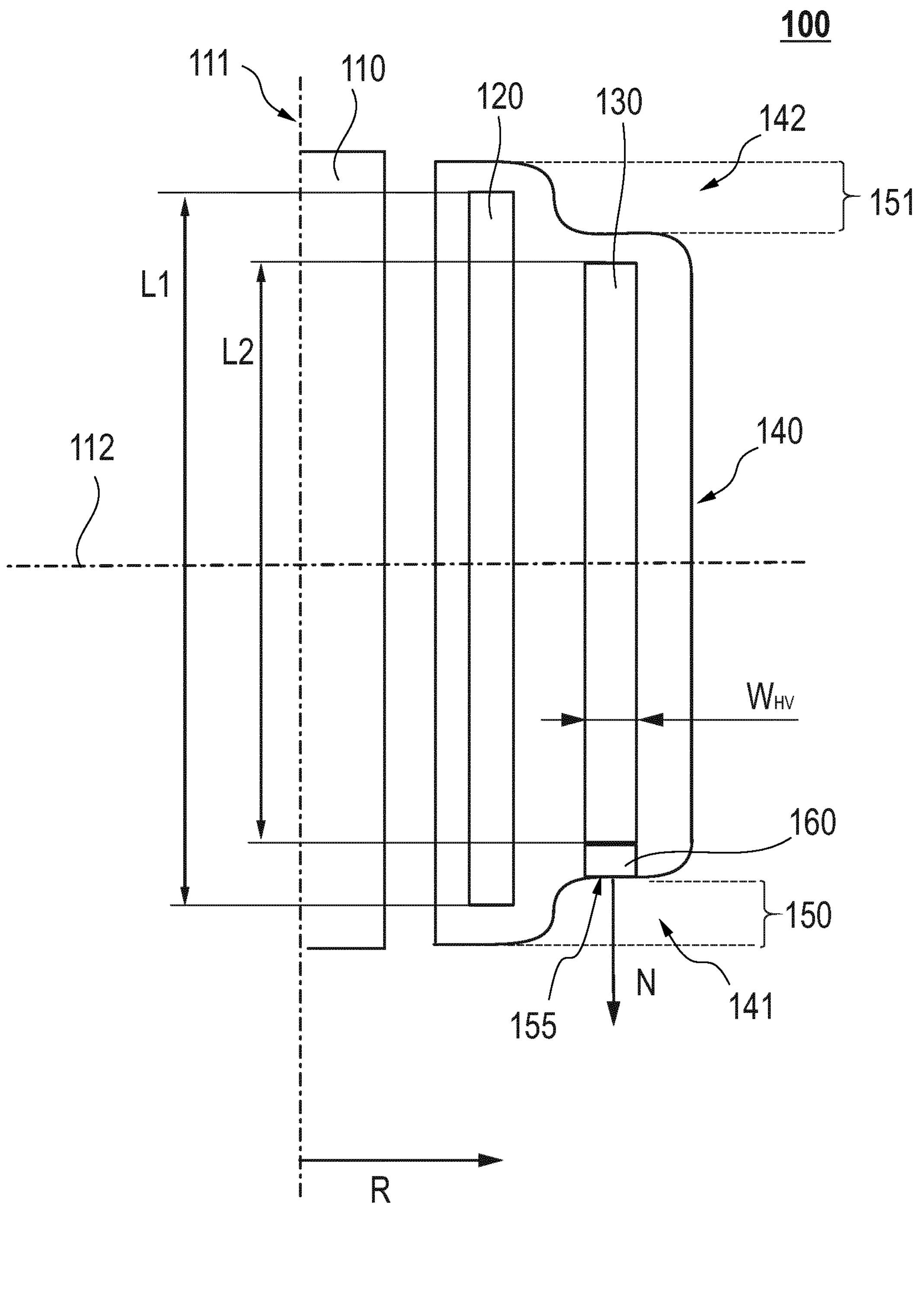
FIG. 1 shows a schematic sectional view of a transformer according to embodiments described herein.

With exemplary reference to FIG. 1, a transformer 100 according to the present disclosure is described. According to embodiments, which can be combined with other embodiments described herein, the transformer 100 includes a transformer core 110 having a core leg having a longitudinal axis 111. Additionally, the transformer 100 includes a low voltage (LV) winding 120 arranged around the core leg. The low voltage winding 120 extends along a first length LI in the direction of the longitudinal axis 111. Further, the transformer 100 includes a high voltage (HV) winding 130 arranged around the low voltage winding 120. The high voltage winding 130 extends along a second length L2 in the direction of the longitudinal axis 111. As shown in FIG. 1, the second length L2 is shorter than the first length L1.

Moreover, the transformer 100 includes a casting 140 embedding the low voltage winding 120 and the high voltage winding 130. The casting 140 has a recess 150, as exemplarily shown in FIG. 1 . The recess 150 is provided at a radial location of the high voltage winding 130. The radial directions is indicated by arrow R in FIG. 1. Further, as shown in FIG. 1, the recess 150 extends in the direction of the longitudinal axis 111. In particular, compared to a radial location of the low voltage winding 120, at the radial location of the high voltage winding 130 the casting 140 has a recess 150 extending in the direction of the longitudinal axis 111. In particular, as exemplarily shown in FIG. 1, it is to be understood that the recess 150 has a certain radial extent (i.e. occupies a 3-dimensional volume). Accordingly, as shown exemplarily in FIG. 1, at the radial location of the high voltage winding 130 the casting 140 has a shorter length compared to a longer length of the casting at the radial location of the low voltage winding 120, in particular wherein the difference between the shorter length and the longer length of the casting provides axial space for the recess 150 and/or a further recess 151.

Accordingly, the design of the transformer of the present disclosure is improved compared to conventional transformers. In particular, by providing a transformer with a casting embedding the low voltage winding and the high voltage winding, a winding arrangement can be provided in which an air gap between the low voltage winding and the high voltage winding can be avoided. Further, providing a casting with a recess as described herein has the advantage that a critical field strength (e.g. 2.588 kV/mm), where streamer inception in air starts, can be avoided. Accordingly, the embodiments of the transformer as described herein provide for an optimized transformer design reducing negative effects caused by an electric field in an air gap between casting and core yoke, particularly at the top of the core window and at the bottom of the core window.

Thus, compared to the state of the art, with the transformer according to embodiments described herein weakening of the dielectric strength in an annular gap between LV and HV winding can be avoided. Accordingly, embodiments of the transformer of the present disclosure provide for an optimal field grading and thus optimal usage of the core window, allowing for a compact and economic transformer design, can be provided.

With exemplary reference to FIG. 1, according to some embodiments, which can be combined with other embodiments described herein, the recess 150 may occupy at least partly a space provided by the second length L2 being shorter than the first length L1. Additionally or alternatively, the recess 150 provides for a surface 155 having a normal N extending substantially in the direction of the longitudinal axis 111. In particular, the recess 150 is bordered by a surface 155 of the casting having a normal N extending substantially in the direction of the longitudinal axis 111. In particular, the surface 155 is a flat annular surface at the radial location of the high voltage winding 130. Typically, the flat annular surface extends at least over a radial width $W_{HV}$ of the high voltage winding 130, as exemplarily shown in FIG. 1.

The expression "a normal N extending substantially in the direction of the longitudinal axis 111" can be understood in that the normal N extends in the direction of the longitudinal axis 111 within a deviation angle D from the direction of the longitudinal axis 111 of D≤±20°, particularly D≤±10°, more particularly D≤±5°.

Figure 2:
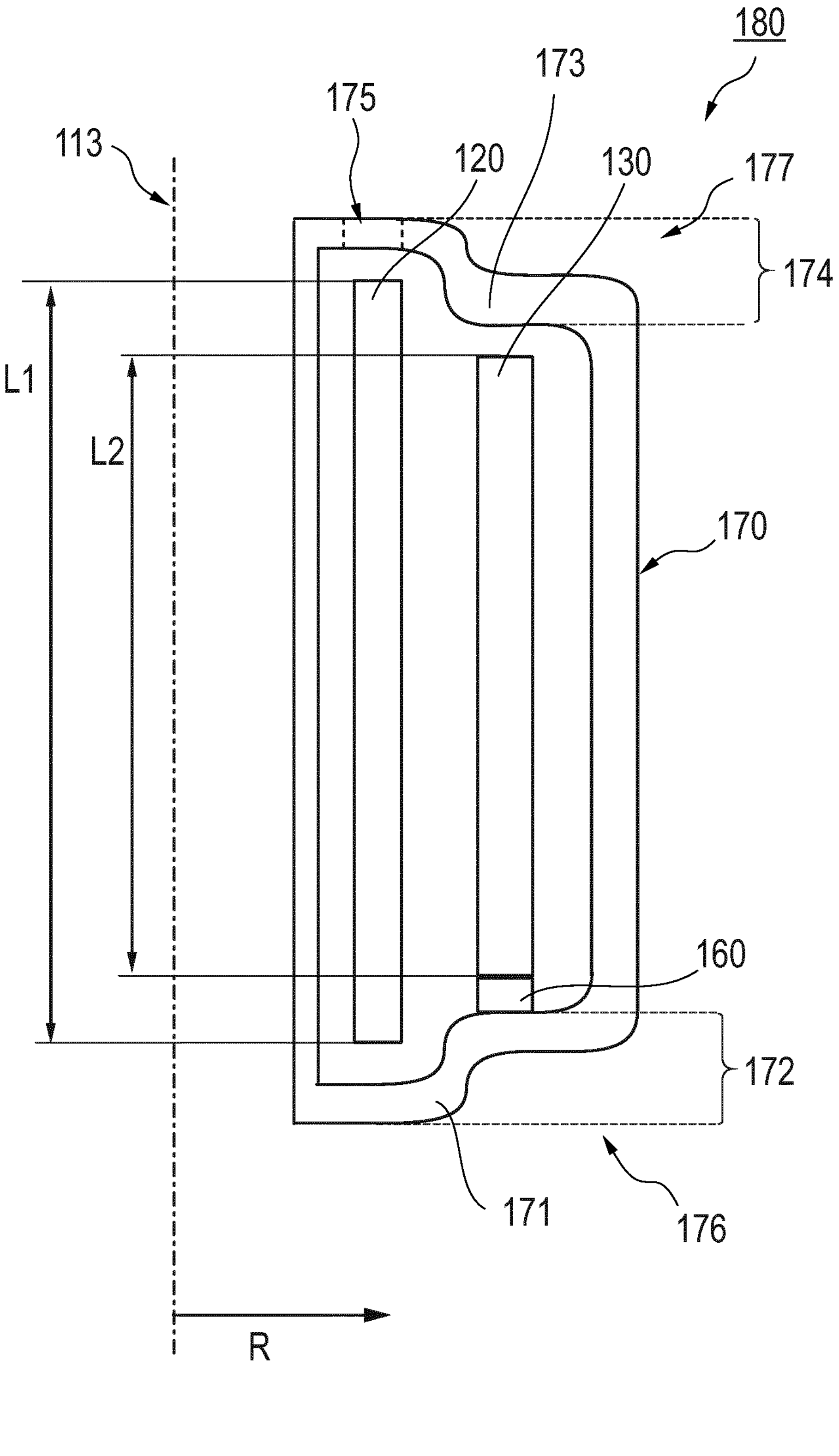
FIG. 2 shows a schematic sectional view of a winding arrangement provided in a casting mold according to embodiments described herein.

According to some embodiments, which can be combined with other embodiments described herein, the transformer further includes a coil block 160 embedded in the casting 140, as exemplarily shown in FIG. 1. More specifically, typically the coil block 160 is provided at a location between the recess 150 and the high voltage winding 130. In particular, from FIG. 1 it is to be understood that the coil block 160 is arranged and configured for providing a vertical support for the high voltage winding. It is to be understood that in the present disclosure the coil block 160, as exemplarily shown in FIGS. 1 and 2, is representative for one or more coil blocks. The one or more coil blocks beneficially provide for a vertical support, i.e. a support in the vertical direction, for the high voltage winding 130 during embedding the low voltage winding 120 and the high voltage winding 130 in the casting 140. In particular, embedding the low voltage winding 120 and the high voltage winding 130 in the casting 140 is conducted by employing a method of manufacturing a winding arrangement of a transformer as described herein.

Some embodiments described herein involve the notion of being "vertical", i.e. being specified with respect to a "vertical direction". A vertical direction is considered as a direction substantially parallel to the direction along which the force of gravity extends, and in the context of an upright transformer shall correspond to the longitudinal axis 111. A vertical direction may deviate from exact verticality (the latter being defined by the gravitational force) by an angle of, e.g., up to 20 degrees. In particular, in the present disclosure the term "vertical" or "vertical direction" may include a deviation angle $D_V$ from the exact verticality of $D_V \leq \pm 20°$, particularly $D_V \leq \pm 10°$, more particularly $D_V \leq \pm 5°$.

With exemplary reference to FIG. 1, according to some embodiments, which can be combined with other embodiments described herein, the recess 150 is provided at a first end 141 of the casting 140. Additionally, the casting 140 can have a further recess 151 provided at a second end 142 of the casting 140. Typically, the second end 142 is opposite the first end 141, as shown in FIG. 1.

In particular, typically the further recess 151 occupies at least partly a space provided by the second length L1 being shorter than the first length L1. According to some embodiments, which can be combined with other embodiments described herein, an axial extent of the recess 150 and the further recess 151 plus the second length L1 is at least approximately equal to the first length. According to some embodiments, which can be combined with other embodiments described herein, an axial extent of the recess 150 and/or the further recess 151 are chosen such that a first surplus axial extent of the casting at the radial location of the high voltage winding 130 over the second length is larger than a second surplus axial extent of the casting at the radial location of the low voltage winding 120 over the first length.

In particular, the further recess 151 provided at the second end 142 may be symmetric to the recess 150 provided at the first end 141 with respect to a symmetry plane 112 extending perpendicular through the longitudinal axis 111, as exemplarily shown in FIG. 1.

According to some embodiments, which can be combined with other embodiments described herein, the casting 140 is made of an insulating material, particularly an insulating resin.

According to some embodiments, which can be combined with other embodiments described herein, the transformer 100 is symmetric with respect to a plane which comprises the longitudinal axis 111. More specifically, the transformer can be mirror symmetric with respect to a plane in which the longitudinal axis 111 is situated.

According to some embodiments, which can be combined with other embodiments described herein, the transformer is a medium frequency transformer. In particular, the transformer can be a dry-cast medium frequency transformer.

In particular, it is to be understood that according to embodiments which can be combined with other embodiments described herein, the low voltage winding and the high voltage winding are cast together without an air gap in-between. Accordingly, beneficially a very space saving transformer design can be provided.

Further, typically the HV winding has a shorter axial length compared to the LV winding, allowing the HV winding to be axially recessed with respect to the LV winding at at least one axial end of the windings. According to an example, the HV winding with the shorter axial length compared to the LV winding is arranged such that the HV winding can be axially recessed with respect to the LV winding at both axial ends of the windings. By providing a recess as described herein, it has been found that beneficially a certain extent of shielding of the HV winding by the LV winding from the electric field of the core yoke can be provided.

Moreover, from FIG. 1 in connection with the description above it is to be understood that a casting outline, particularly the casting outline in a meridian cross-section, follows the recess of the HV winding, forming an annular horizontal surface. The annular horizontal surface beneficially enables the positioning of one or more coil blocks that are cast together with the HV winding and the LV winding. For example, the one or more coil blocks can be made of the same material as the casting, e.g. an insulating material, particularly an insulating resin. Thereby, the HV winding can be positioned on a bottom surface of the casting mold, without needing a bobbin for the HV winding. The absence of a HV bobbin beneficially saves space and avoids weakening of the dielectric strength which typically occurs in an annular gap between LV and HV winding of conventional transformers, particularly conventional medium-frequency transformers.

Figure 3A:
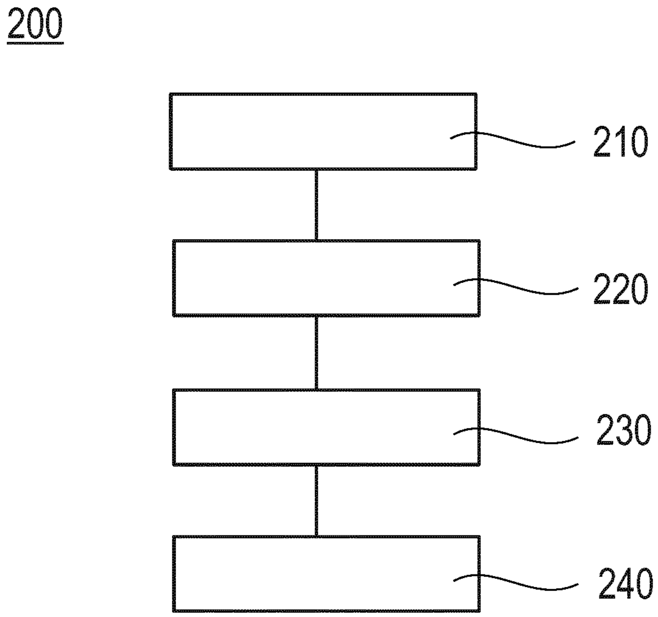
FIGS. 3A and 3B show flow charts for illustrating embodiments of a method of manufacturing a winding arrangement for a transformer according to the present disclosure.
Figure 3B:
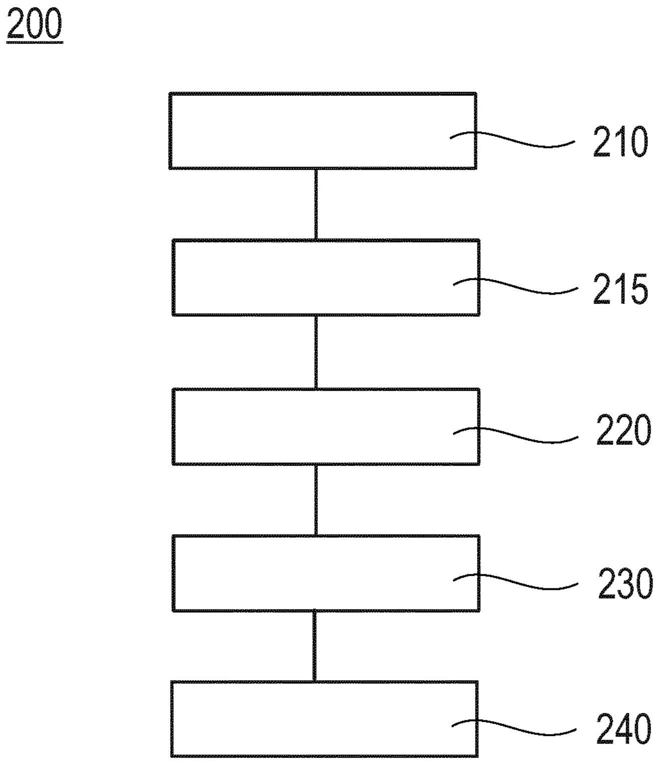

With exemplary reference to the flowcharts shown in FIGS. 3A and 3B in connection with FIG. 2, showing a schematic sectional view of a winding arrangement including a low voltage winding 120 and a high voltage winding 130 provided in a casting mold 140, embodiments of a method of manufacturing a winding arrangement for a transformer according to the present disclosure are described.

According to embodiments, which can be combined with other embodiments described herein, the method 200 of manufacturing a winding arrangement for a transformer includes arranging (represented by block 210 in FIGS. 3A and 3B) a low voltage winding 120 around a substantially vertical axis 113 such that the low voltage winding 120 extends along a first length L1 in the direction of the substantially vertical axis, or substantially longitudinally axis 111. As described herein, a "substantially vertical axis" can be understood as an axis deviating from exact verticality (the latter being defined by the gravitational force) by an angle of, e.g., up to 20 degrees. Accordingly, a "substantially vertical axis" may refer to an axis having a deviation angle $D_V$ from the exact verticality of $D_V \leq \pm 20°$, particularly $D_V \leq \pm 10°$, more particularly $D_V \leq 5°$.

Additionally, the method includes arranging (represented by block 220 in FIGS. 3A and 3B) a high voltage winding 130 around the low voltage winding 120 such that the high voltage winding 130 extends along a second length L2 in the direction of the substantially vertical axis. As exemplarily shown in FIG. 2, the second length L2 is shorter than the first length L1. Further, the method includes providing (represented by block 230 in FIGS. 3A and 3B) a casting mold 170 surrounding the low voltage winding 120 and the high voltage winding 130, as exemplarily shown in FIG. 2. The casting mold has a bottom wall 171. At a radial location of the high voltage winding 130 the bottom wall 171 has an axial indentation 172, or vice versa an axial projection at a radial location of the low voltage winding 120. In particular, as exemplarily shown in FIG. 2, typically the axial indentation 172 of the casting mold 170 is provided at a first end 176 of the casting mold 170.

Moreover, the method includes embedding (represented by block 240 in FIGS. 3A and 3B) the low voltage winding 120 and the high voltage winding 130 in an insulating material by casting the insulating material into the casting mold 170. Typically, casting the insulating material into the casting mold 170 is conducted by pouring the insulating material through a casting mold opening 175 provided in the top wall 173 of casting mold 170, as exemplarily shown in FIG. 2

Accordingly, by employing a method of manufacturing a winding arrangement for a transformer as described herein beneficially provides for improving the design of a transformer, particularity with respect to compactness and economical aspects. In particular, an improved winding arrangement can be provided such that a transformer with an optimized field grading and thus usage of the core window can be provided.

According to some embodiments, which can be combined with other embodiments described herein, the method further includes placing (represented by block 215 in FIG. 3B) a coil block 160 on the bottom wall 171 of the casting mold 170 at the radial location of the high voltage winding 130 prior to arranging the high voltage winding 130 around the low voltage winding 120. With exemplary reference to FIG. 2, typically the bottom wall 171 of the casting mold 170 is essentially horizontal at the radial location of the high voltage winding 130, in particular at the radial location of the recess 150, in particular for providing an essentially horizontal surface 155 of the recess 150.

As shown in FIG. 2, typically the bottom wall 171 of the casting mold 170 is essentially lying-S-shaped (or arctan-shaped) with being essentially horizontal (or perpendicular to the longitudinal axis 111) at the radial location of the low voltage winding 120 and being horizontal at the radial location of the high voltage winding 130. The expression "essentially horizontal" can be understood as being horizontal within a small deviation from the exact horizontal, e.g. by a deviation angle $D_H$ of $D_H \leq \pm 20°$, particularly $D_H \leq \pm 10°$, more particularly $D_H \leq \pm 5°$.

With exemplary reference to FIG. 2, according to some embodiments, which can be combined with other embodiments described herein, the casting mold 170 has a top wall 173, wherein the top wall 173 has an axial indentation 174 at a radial location of the high voltage winding 130, in particular at the radial location of the further recess 151, in particular for providing an essentially horizontal surface of the further recess 151.

As exemplarily shown in FIG. 2, the axial indentation 174 can be provided at a second end 177 of the casting mold 170. The second end 177 of the casting mold 170 is opposite the first end 176 of the casting mold 170.

According to some embodiments, which can be combined with other embodiments described herein, the top axial indentation 174 can be symmetric to the bottom axial indentation 172 with respect to a symmetry plane 112 extending perpendicular through the substantially vertical axis or longitudinal axis 111.

It is to be understood that after the low voltage winding 120 and the high voltage winding 130 are cast in the insulating material, the casting mold 170 is removed. Further, it is to be understood, that in order to provide a transformer, the winding arrangement 180 may be arranged around a transformer core 110. Accordingly, in an assembled state of the transformer, the substantially vertical axis 113 shown in FIG. 2 may coincide with the longitudinal axis 111 as shown in FIG. 1.

In view of the above, it is to be understood that compared to the state of the art, embodiments of the present disclosure beneficially provide for an improved transformer design which allows for an optimal field grading and thus usage of the core window. Accordingly, a compact and economic transformer design can be provided. In particular, as described herein the transformer of the present disclosure can be a dry-cast transformer having a high voltage (HV) winding arranged around a low voltage (LV) winding, with both LV and HV windings being cast together. The HV winding is axially shorter than the LV winding, and the casting has an axial recess at the HV winding with respect to the casting extension at the LV winding. Preferably, the recess provides a near-horizontal surface that allows positioning the HV winding in the mold on coil blocks, without the need of a bobbin for the HV winding.

While the foregoing is directed to embodiments, other and further embodiments may be devised without departing from the basic scope, and the scope is determined by the claims that follow.

REFERENCE NUMBERS

100 transformer
110 transformer core
111 longitudinal axis
112 symmetry plane
113 substantially vertical axis
120 low voltage winding
130 high voltage winding
140 casting
141 first end of casting
142 second end of casting
150 recess
151 further recess
155 surface
160 coil block
170 casting mold
171 bottom wall of casting mold
172 axial indentation of casting mold
173 top wall of casting mold
174 axial indentation of casting mold
175 casting mold opening
176 first end of casting mold
177 second end of casting mold
180 winding arrangement
200 method of manufacturing a winding arrangement for a transformer
210 arranging a low voltage winding around a substantially vertical axis
215 placing a coil block on the bottom wall of the casting mold
220 arranging a high voltage winding around the low voltage winding
230 providing a casting mold
240 embedding the low voltage winding and the high voltage winding in an insulating material
L1 first length
L2 second length
N normal
R radial direction

The invention claimed is:

1. A transformer, comprising:

a transformer core having a core leg having a longitudinal axis;

a low voltage winding arranged around the core leg, the low voltage winding extending along a first length in the direction of the longitudinal axis;

a high voltage winding arranged around the low voltage winding, the high voltage winding extending along a second length in the direction of the longitudinal axis, wherein the second length is shorter than the first length; and a casting embedding the low voltage winding and the high voltage winding, wherein the casting has a recess, wherein the recess is provided at a radial location of the high voltage winding, and wherein the recess extends in the direction of the longitudinal axis, the recess occupying at least partly a space provided by the second length being shorter than the first length; and the recess providing for a surface having a normal extending substantially in the direction of the longitudinal axis and the surface is a flat annular surface at a radial location of the high voltage winding.

2. The transformer of claim 1, further comprising a coil block embedded in the casting, wherein the coil block is provided between the recess and the high voltage winding.

3. The transformer of claim 2, wherein the coil block is arranged and configured for providing a vertical support of the high voltage winding.

4. The transformer of claim 3, wherein the coil block is arranged and configured for providing a vertical support of the high voltage winding during embedding the low voltage winding and the high voltage winding in the casting.

5. The transformer of claim 1, wherein the recess is provided at a first end of the casting, and wherein the casting has a further recess provided at a second end of the casting wherein the second end is opposite the first end.

6. The transformer of claim 5, wherein the further recess occupies at least partly a space provided by the second length being shorter than the first length.

7. The transformer of claim 5, wherein an axial extent of the recess and the further recess plus the second length is at least approximately equal to the first length.

8. The transformer of claim 5, wherein an axial extent of the recess and/or the further recess are chosen such that a first surplus axial extent of the casting at the radial location of the high voltage winding over the second length is larger than a second surplus axial extent of the casting at the radial location of the low voltage winding over the first length.

9. The transformer of claim 5, wherein the further recess provided at the second end is symmetric to the recess provided at the first end with respect to a symmetry plane extending perpendicular through the longitudinal axis.

10. The transformer of claim 1, wherein the casting is made of an insulating material.

11. The transformer of claim 10, wherein the insulating material comprises an insulating resin.

12. The transformer of claim 1, wherein the transformer is symmetric with respect to a plane which comprises the longitudinal axis.

13. The transformer of claim 1, wherein the transformer is a medium frequency transformer.

14. The transformer of claim 13, wherein the medium frequency transformer is a dry-cast medium frequency transformer.

15. Method of manufacturing a winding arrangement for a transformer, the method comprising:

arranging a low voltage winding around a substantially vertical axis such that the low voltage winding extends along a first length in the direction of the substantially vertical axis;

arranging a high voltage winding around the low voltage winding such that the high voltage winding extends along a second length in the direction of the substantially vertical axis, wherein the second length is shorter than the first length;

providing a casting mold surrounding the low voltage winding and the high voltage winding, wherein the casting mold has a bottom wall, wherein at a radial location of the high voltage winding the bottom wall has an axial projection; wherein the axial projection is essentially horizontal for providing a horizontal surface of recess, wherein the recess occupies at least partly a space provided by the second length being shorter than the first length; and embedding the low voltage winding and the high voltage winding in an insulating material by casting the insulating material into the casting mold.

16. The method of claim 15, further comprising placing a coil block on the bottom wall of the casting mold at the radial location of the high voltage winding prior to arranging the high voltage winding around the low voltage winding.

17. The method of claim 15, wherein the casting mold has a top wall, wherein the top wall has an axial indentation at a radial location of the high voltage winding.

18. The method of claim 17, wherein the axial indentation is symmetric to the axial projection with respect to a symmetry plane extending perpendicular through the substantially vertical axis.

19. The method of claim 17, wherein the axial indentation is at the radial location of the further recess.

20. The method of claim 17, wherein the axial indentation comprises a horizontal surface of the further recess.

* * * * *